(12) United States Patent
McBride et al.

(10) Patent No.: US 11,774,040 B2
(45) Date of Patent: Oct. 3, 2023

(54) INJECTOR PISTON WITH IMPROVED SEAL

(71) Applicants: LINCOLN INDUSTRIAL CORPORATION, St. Louis, MO (US); AKTIEBOLAGET SKF, Gothenburg (SE)

(72) Inventors: Tadd McBride, Riverton, UT (US); Chris Holland, Wood River, IL (US); Brandon Green, Taylorsville, UT (US)

(73) Assignees: LINCOLN INDUSTRIAL CORPORATIO, St. Louis, MO (US); AKTIEBOLAGET SKF, Gothenburg (SE)

( * ) Notice: Subject to any disclaimer, the term of this patent is extended or adjusted under 35 U.S.C. 154(b) by 475 days.

(21) Appl. No.: 17/013,714

(22) Filed: Sep. 7, 2020

(65) Prior Publication Data

US 2022/0074545 A1 Mar. 10, 2022

(51) Int. Cl.
*F16N 25/02* (2006.01)
*F16J 9/12* (2006.01)
*F16N 27/00* (2006.01)

(52) U.S. Cl.
CPC ............ *F16N 25/02* (2013.01); *F16J 9/12* (2013.01); *F16N 27/00* (2013.01)

(58) Field of Classification Search
CPC .... F16N 27/00; F16N 25/02; F16J 9/12; F16J 1/008
See application file for complete search history.

(56) References Cited

U.S. PATENT DOCUMENTS

| | | | |
|---|---|---|---|
| 8,893,857 B2 * | 11/2014 | Ifield | F16N 11/10 184/6.23 |
| 2013/0092475 A1 * | 4/2013 | Arens | F16N 27/00 184/7.4 |
| 2015/0129362 A1 * | 5/2015 | Clark | F16N 25/02 184/7.4 |

FOREIGN PATENT DOCUMENTS

WO WO-2016176586 A1 * 11/2016 ............... F01M 1/08

* cited by examiner

*Primary Examiner* — Abiy Teka
(74) *Attorney, Agent, or Firm* — J-TEK LAW PLLC; Scott T. Wakeman; Mark A. Ussai (57) ABSTRACT

A piston assembly is for a fluid delivery device, preferably a lubricant injector, the injector having a measuring chamber defined by an inner cylindrical surface and an axial end face, a flow port through the end face, and a central axis extending through the chamber. The piston assembly includes a piston body disposeable within the chamber so as to be linearly displaceable along the central axis. The piston body includes a cylindrical head, the head having first and second axial ends and an outer circumferential surface, and a rod extending axially from the second axial end of the piston head. A seal is coupled with the first axial end of the piston head and has an annular lip sealingly engageable with the chamber inner cylindrical surface and an axial end engageable with the chamber end face.

20 Claims, 12 Drawing Sheets

INJECTOR PISTON WITH IMPROVED SEAL

BACKGROUND OF THE INVENTION

The present invention relates to seals, and more particularly to seals for injector pistons.

Lubricant injectors typically include a measuring chamber to meter a desired quantity of lubricant for subsequent injection to a specific point to be lubricated, such as a bearing, a gear face, etc. A piston is disposed within the chamber and displaces away from a port as lubricant enters the chamber until reaching a stop, at which point the chamber is filed with the desired quantity. Thereafter, the lubricant is ejected from the chamber through the port by a subsequent return stroke of the piston.

A typical lubricant piston includes a head sized slightly lesser than the measuring chamber bore and a rod extending from a rear end of the head, which functions to both guide the head and provides as an external visual indicator. During both the filling and ejecting of lubricant, the piston head must be sealed to prevent leakage about the head, which can obstruct the displacement of the piston head and leak from the injector. Depending on the seal design, fluid pressure may cause portions of the seal material to become extruded between the head and the chamber wall, leading to seal failure and malfunctioning of the piston.

SUMMARY OF THE INVENTION

In one aspect, the present invention is a piston assembly for a lubricant injector. The injector has a measuring chamber defined by an inner cylindrical surface and an axial end face, a flow port through the end face, and a central axis extending through the chamber. The piston assembly comprises a piston body disposeable within the chamber so as to be linearly displaceable along the central axis. The piston body includes a cylindrical head, the head having first and second axial ends and an outer circumferential surface, and a rod extending axially from the second axial end of the piston head. A seal is coupled with the first axial end of the piston head and has an annular lip sealingly engageable with the chamber inner cylindrical surface and an axial end engageable with the chamber end face.

In another aspect, the present invention is a seal for a piston assembly for a lubricant injector, the injector having a measuring chamber defined by an inner cylindrical surface and an axial end face, a flow port through the end face, and a central axis extending through the chamber. The piston assembly includes a piston body disposeable within the chamber so as to be linearly displaceable along the central axis and includes a head having first and second axial ends. The seal comprises a cylindrical polymeric body having a first axial end coupled with the first axial end of the piston head, an annular lip sealingly engageable with the chamber inner cylindrical surface and an axial end engageable with the chamber end face.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-12 a dosing piston assembly 10 for a fluid delivery device 1, preferably a lubricant injector 1 for metering and distributing grease or any other appropriate lubricant. However, the dosing piston assembly 10 may be used in any other appropriate fluid delivery device 1 for delivering a metered dose of any desired fluid, such as for example, soap, drinks, syrups, adhesives, etc. The preferred lubricant injector 1 has a measuring chamber 2 defined by an inner cylindrical surface 2a and an axial end face 2b, a flow port 3 through the end face 2b, and a central axis $A_C$ extending through the chamber 2. The measuring chamber 2 is preferably provided by a fixed stem 4 attached to an injector body 5 and a movable adjusting nut 6 threadably coupled with the stem 4, so to vary the volume of the measuring section 2c of the chamber 2. The piston assembly 10 basically comprises a piston body 12 disposeable within the measuring chamber 2 and a seal 14 coupled with the piston body 12, the piston body 12 preferably being formed of a metallic material, such as low carbon steel, and the seal 14 preferably being formed of a polymeric material, most preferably polyurethane.

Figure 1:
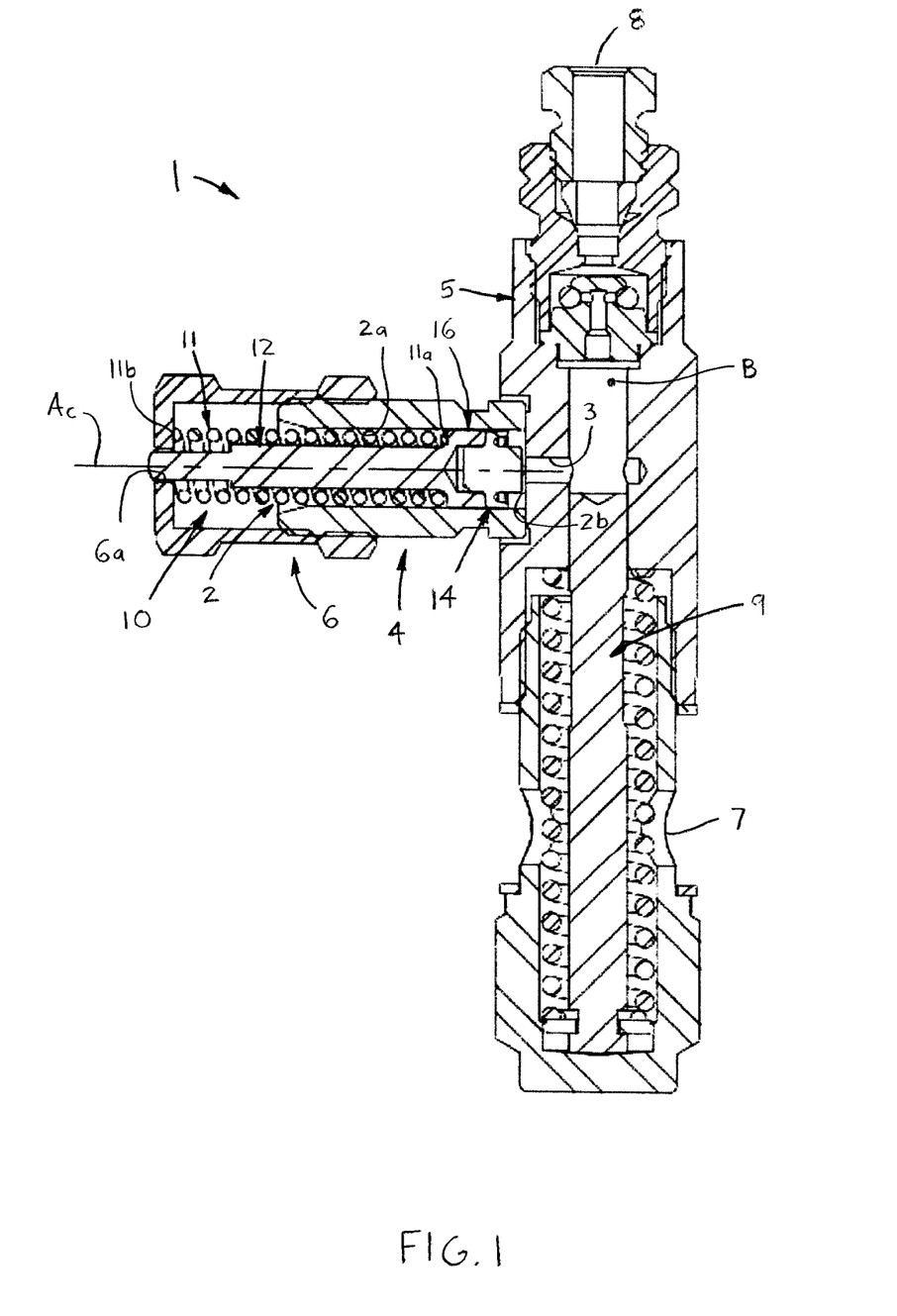
FIG. 1 is an axial cross-sectional view of a simplified injector including a first construction piston assembly according to the present invention.
Figure 2:
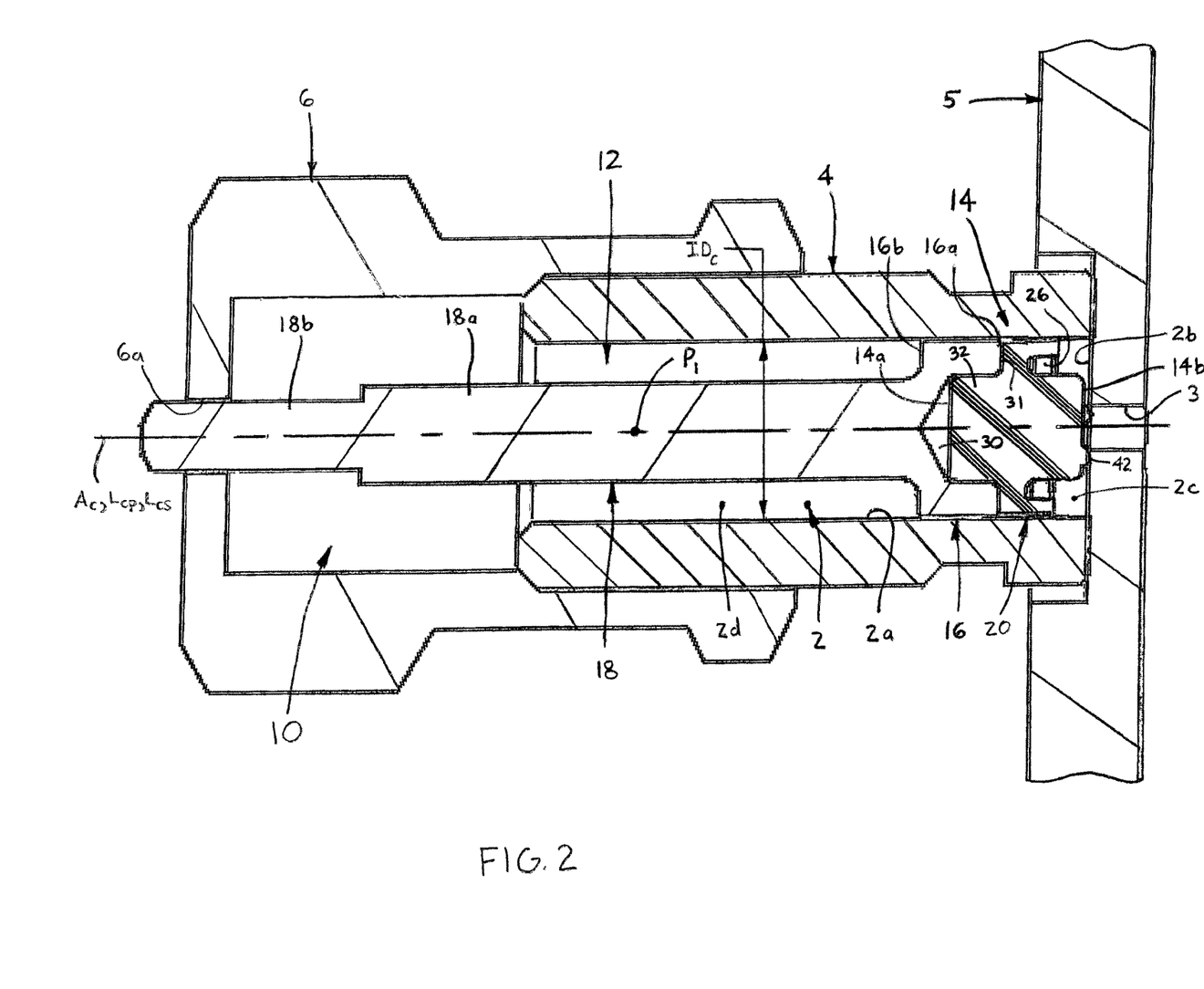
FIG. 2 is a broken-away, enlarged, axial cross-sectional view of a portion of FIG. 1, showing the piston assembly in a first position within a measuring chamber.
Figure 3:
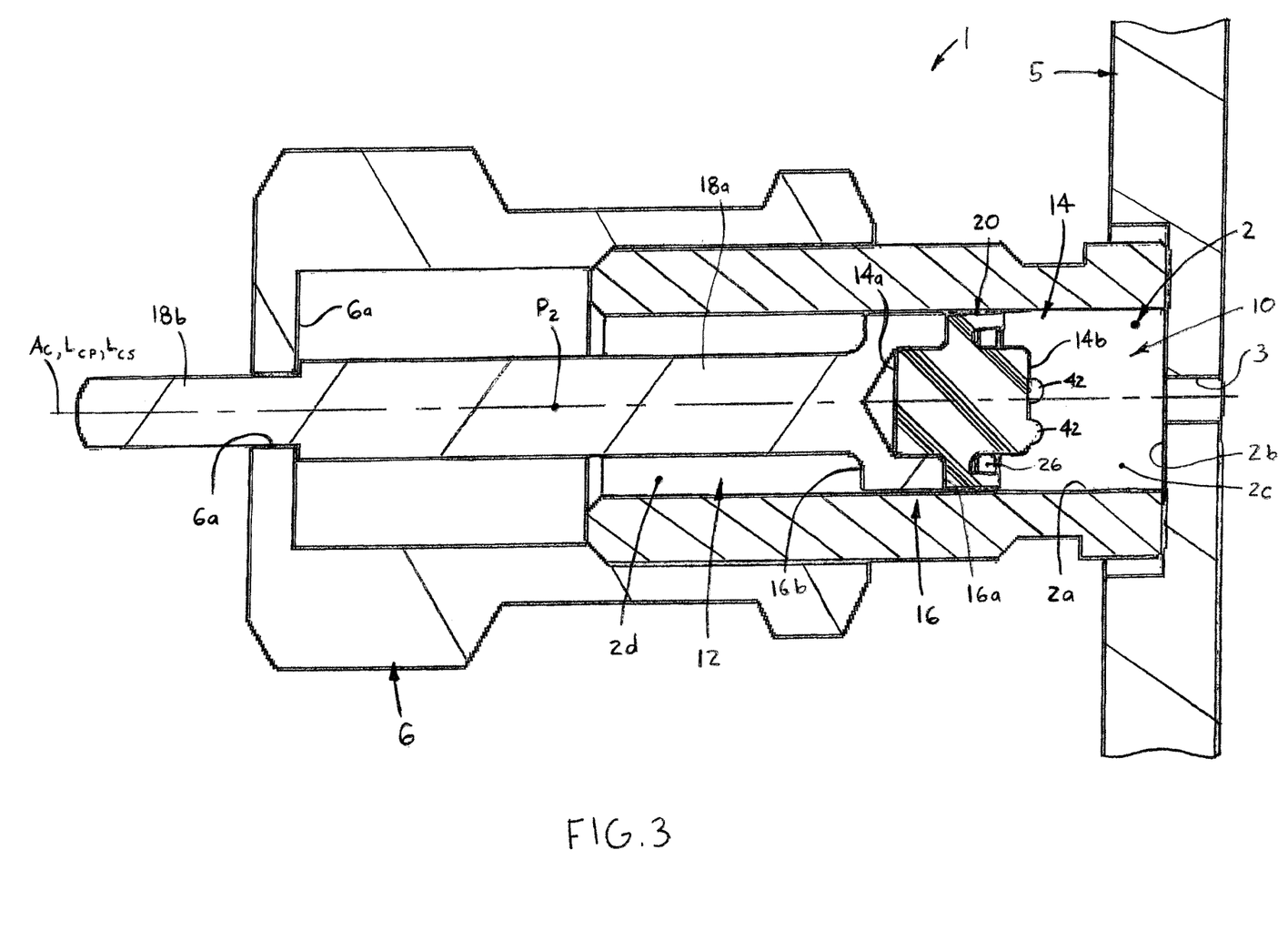
FIG. 3 is a broken-away, enlarged, axial cross-sectional view of a portion of FIG. 1, showing the piston assembly in a second position within the measuring chamber.
Figure 4:
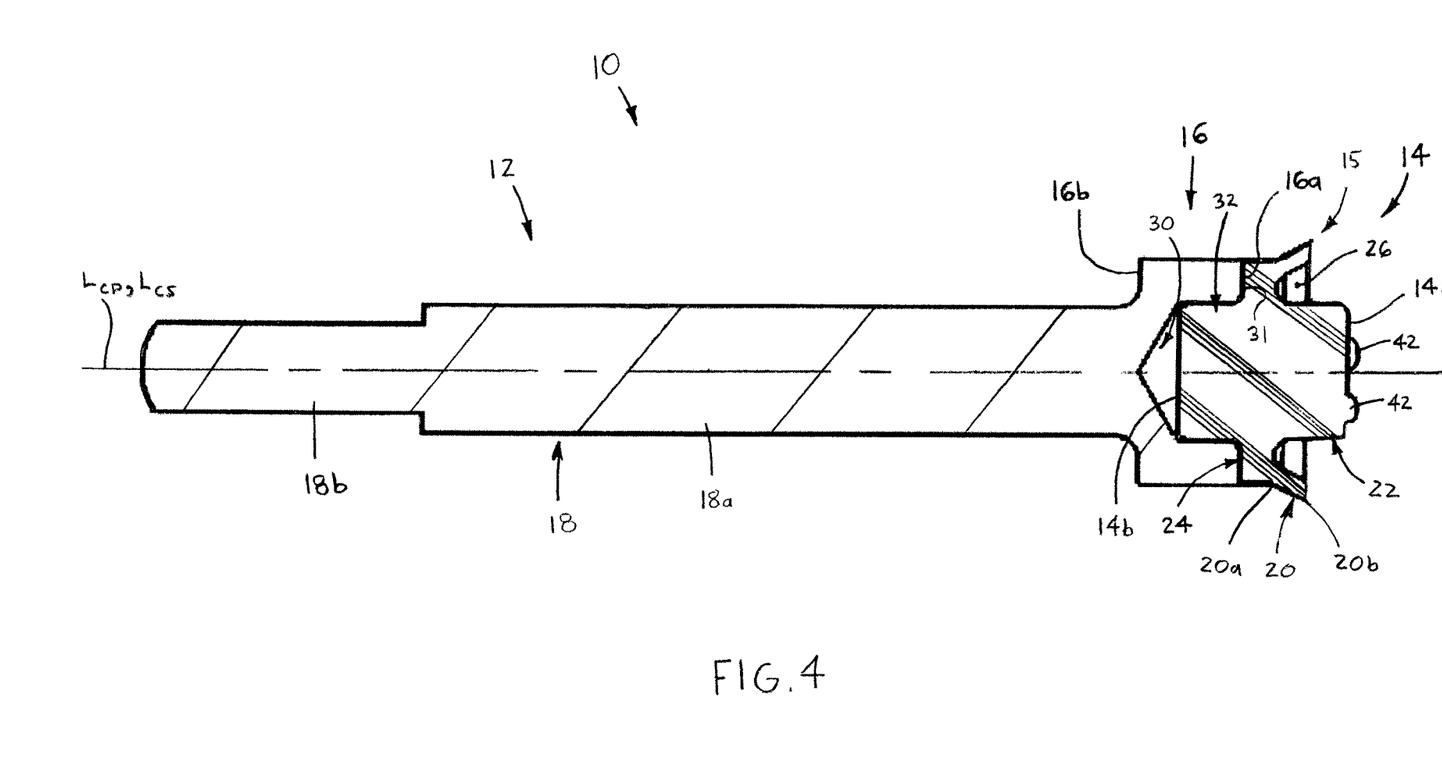
FIG. 4 is an axial cross-sectional view of the first construction piston assembly.
Figure 5:
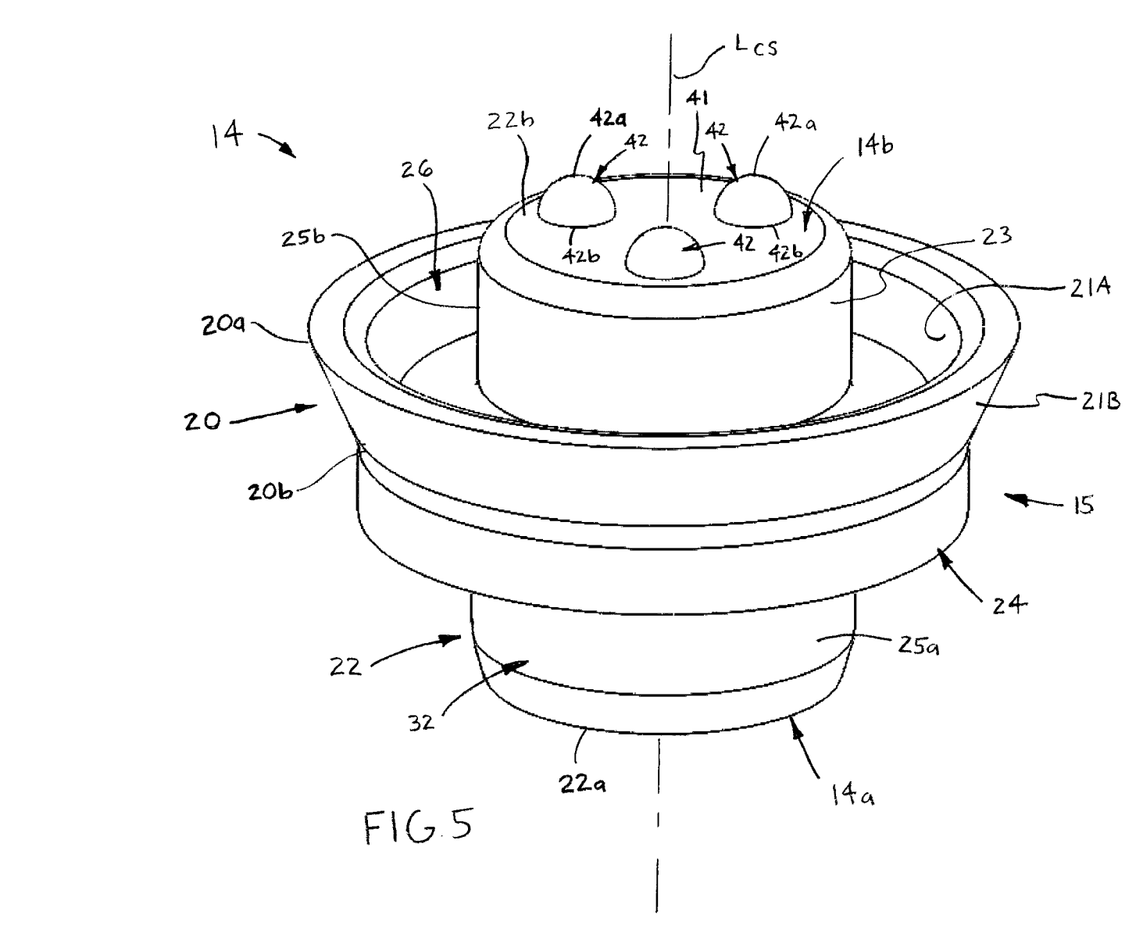
FIG. 5 is a perspective view of a seal of the first construction piston assembly.
Figure 6:
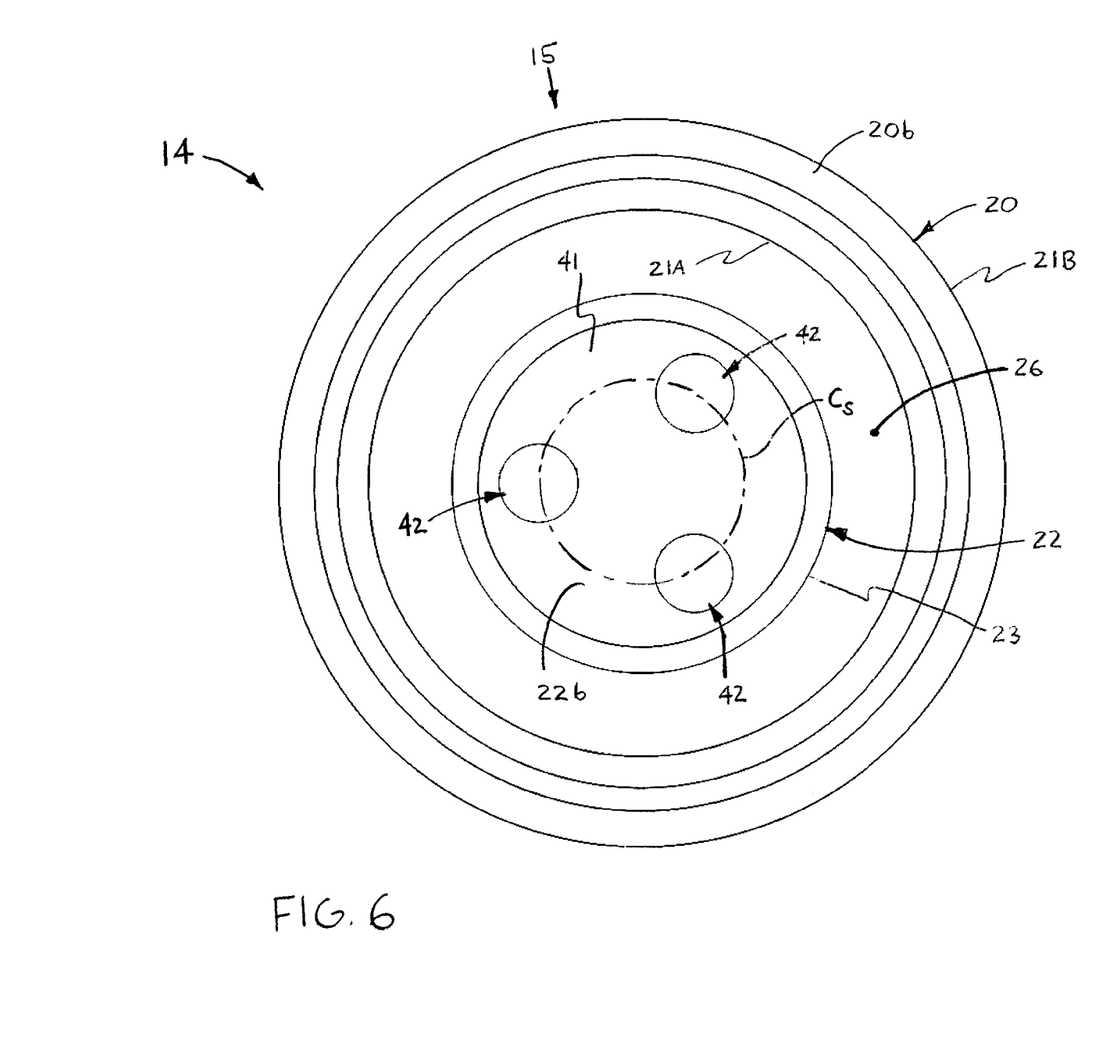
FIG. 6 is a top plan view of the seal of FIG. 5.
Figure 7:
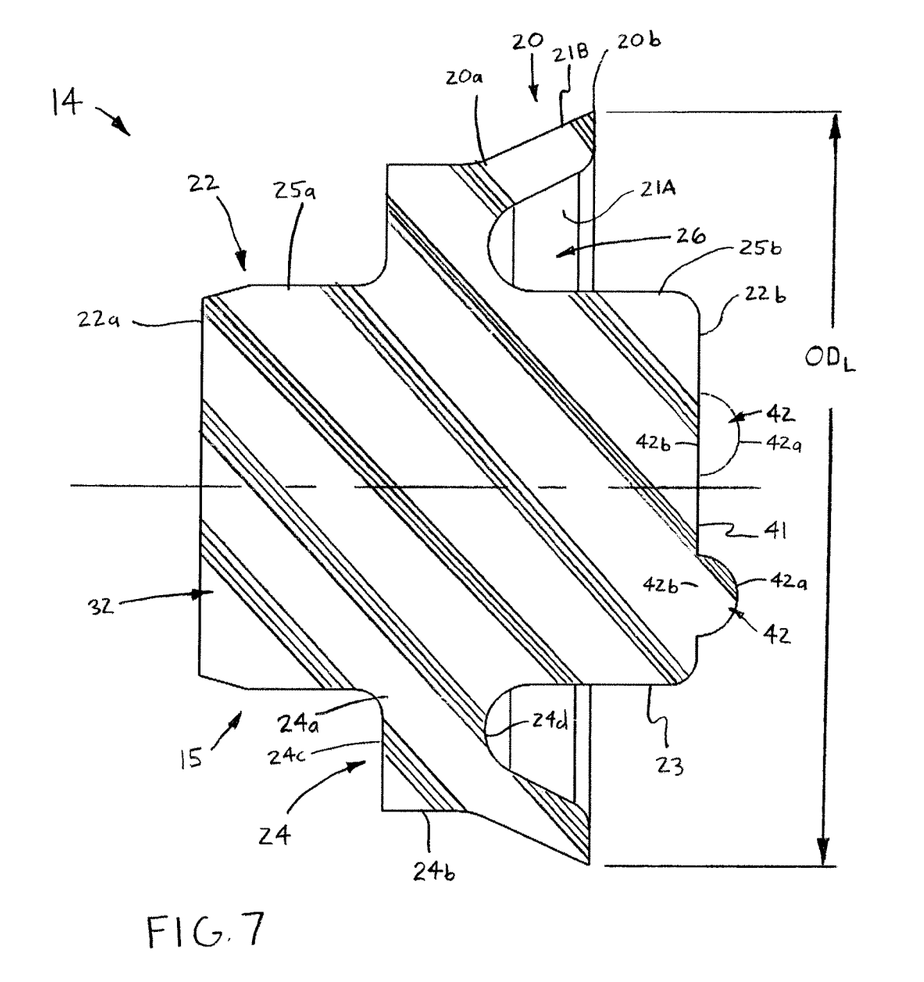
FIG. 7 is an axial cross-sectional view of the seal of FIG. 5.

Specifically, the piston body 12 is linearly displaceable along the axis $A_C$, has a centerline $L_{CP}$ coaxial with the measuring chamber axis $A_C$ when disposed within the chamber 2, and includes a cylindrical head 16 and a rod 18 attached to the head 16. The piston head 16 is generally cylindrical and has first and second axial ends 16a, 16b, respectively, and an outer circumferential surface 17 extending between the ends 16a, 16b. The rod 18 is generally elongated and extends generally axially away from the second axial end 16b of the piston head 16. Preferably, the rod 18 includes an inner, diametrically-larger section 18a attached to the head 16 and an outer, diametrically-smaller section 18b extending through an opening 6a in the adjusting nut 6, as discussed below, so as to provide a visual indicator. Also, the end of larger rod section 18a engages with an end surface 6a of the adjusting nut 6 to limit displacement of the piston assembly 10, and thereby determines the volume of the measuring section 2c, as shown in FIG. 3. The piston head 16 and rod 18 are preferably integrally formed, but may alternatively be provided as two or more separately attached components. Further, a spring 11 (FIG. 1), preferably a compression coil spring, is disposed about the rod 18 and has a first end 11a disposed against the second end 16b of the piston head 16 and a second end 11b disposed against the nut end surface 6a. The spring 11 is configured to displace the piston assembly 10 from a second position $P_2$ of the piston assembly toward a first position $P_1$, as described below.

Furthermore, the seal 14 includes a generally cylindrical body 15 and has opposing axial ends 14a, 14b and an annular, radially deflectable sealing lip 20. The seal first axial end 14a is coupled with the first axial end 16a of the piston head 16 and the seal second axial end 14b is engageable with the chamber end face 2b. The sealing lip 20 is sealingly engageable with the chamber inner cylindrical surface 2a to prevent fluid, specifically lubricant within the chamber 2, to pass around the piston head 16 and enter the chamber section 2d "behind" the head 16. Such fluid leakage may potentially hinder displacement of the piston 12 within the chamber 2, particularly during a measuring stroke, and bleed from a bearing port 6a of the adjusting nut 6 of the injector 1, as discussed below.

Referring to FIGS. 6-11, the seal body 15 preferably includes an inner cylindrical portion 22 and a radial shoulder portion 24 connecting the sealing lip 20 with the cylindrical portion 22. The inner cylindrical portion 22 has an outer circumferential surface 23 and first and second axial ends 22a, 22b, respectively. The cylindrical portion ends 22a, 22b provide the seal first and second axial ends 14a, 14b, respectively, such that the cylindrical portion first end 22a is coupled with the piston head 12 and the second axial end 22b is engageable with the chamber end face 2b. The radial shoulder portion 24 has an inner radial end 24a connected with, preferably integrally formed with, the cylindrical portion 22, an opposing outer radial end 24b, and first and second axial ends 24c, 24d, respectively. The sealing lip 20 extends axially from the outer end 24b of the shoulder portion 24 and is spaced radially outwardly from the cylindrical portion 22, such that an annular channel 26 is defined between the cylindrical portion 22 and the lip 20, for reasons discussed below.

More specifically, the annular sealing lip 20 has a first axial end 20a integrally formed with the outer radial end 24b of the shoulder portion 24 and a free, second axial end 20b, such that the lip 20 is generally cantilever-like and is radially deflectable with respect to the shoulder portion 24, and therefore the remainder of the seal 14. The sealing lip 20 further has an inner circumferential surface 21A and an opposing outer circumferential surface 21B, the outer surface 21B being sealingly engageable with the chamber cylindrical surface 2a, for the reasons discussed above. Preferably, the sealing lip 20 is angled or tapered so as to extend radially-outwardly in an axial direction from the lip first end 20a to the lip second end 20b when the piston assembly 10 is separate from the measuring chamber 2. That is, the sealing lip 20 is angled when the piston assembly 10 is located externally of the chamber 2 and has an outside diameter $OD_L$ (FIG. 7) greater than the inside diameter $ID_C$ (FIG. 2) of the chamber 2.

However, to install the piston assembly 10 within the chamber 2, the sealing lip 20 must be deflected radially inwardly by the chamber wall 5a, which increases the sealing pressure of the lip 20 against the chamber cylindrical surface 2a. Due to the taper, the sealing pressure is greatest at the lip second or outer end 20b and decreases toward the first or inner end 20a, thereby also decreasing the likelihood of extrusion of seal material between the piston head 16 and the chamber inner surface 2a. Also, lubricant within the annular channel 26 further increases the sealing pressure, particularly when lubricant first enters the measuring chamber 2 as described below.

Figure 8:
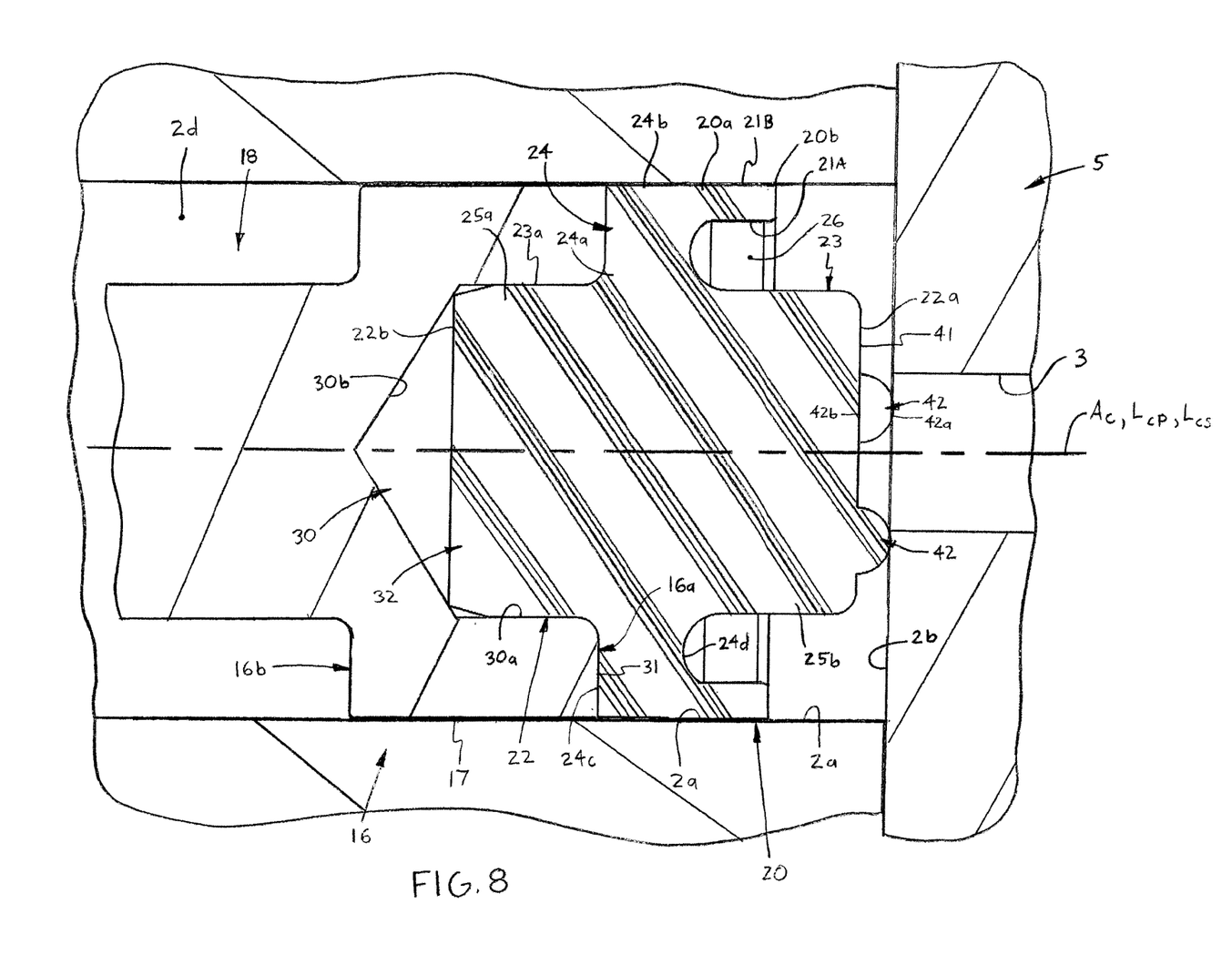
FIG. 8 is a broken-away, more enlarged axial cross-sectional view of the first construction piston assembly.

Referring to FIGS. 1-8, in certain constructions of the piston assembly 10, the piston head 16 has a cavity 30 and the seal 14 has a projection 32 disposeable within the cavity 30 to couple the seal 14 with the piston 12. More specifically, the cavity 30 extends axially inwardly from the first axial end 16a of the piston head 16 and is defined by an inner circumferential surface 30a and a radial end surface 30b, as indicated in FIG. 8, the end surface 31a being generally conical due to forming by machining. Also, the piston head 16 further has an annular surface 31 defined on the first axial end 16a of the piston head 16, the annular surface 31 extending radially between the piston cavity 30 and the outer circumferential surface 17 of the piston head 16.

Further, the seal shoulder portion 24 is disposed generally centrally on the seal cylindrical portion 22. As such, a first section 25a of the body cylindrical portion 22 is defined between the shoulder 24 and the first axial end 22a and a second section 25b of the body cylindrical portion 22 is defined between the shoulder portion 24 and the second axial end 22b. The cylindrical portion first section 25a provides the projection 32 and is therefore disposed within the piston head cavity 30 to couple the seal 14 with the piston 12. Preferably, a section 23a (FIG. 8) of the outer surface 23 on the first section 25a of the cylindrical body portion 22 is diametrically sized to frictionally engage with the inner surface 30a of the cavity 30, to thereby frictionally couple the seal 14 with the piston 12. However, the seal projection 32/cylindrical portion first section 25a may secured in the piston head cavity 30 by any appropriate means, such as an adhesive, one or more fasteners, etc.

Furthermore, the first axial end 24c of the seal shoulder portion 24 is spaced axially inwardly from the cylindrical portion first end 22a and the shoulder portion second axial end 24d is spaced axially inwardly from the cylindrical portion second end 22b. The annular surface 31 of the piston head 16 is preferably disposed against the first axial end 24c of the shoulder 24 and the sealing lip 20 extends axially from the second axial end 24d of the shoulder portion 24. As such, the sealing lip 20 is supported axially by both the seal shoulder portion 24 and the portion of the piston head 16 providing the annular surface 31.

Figure 9:
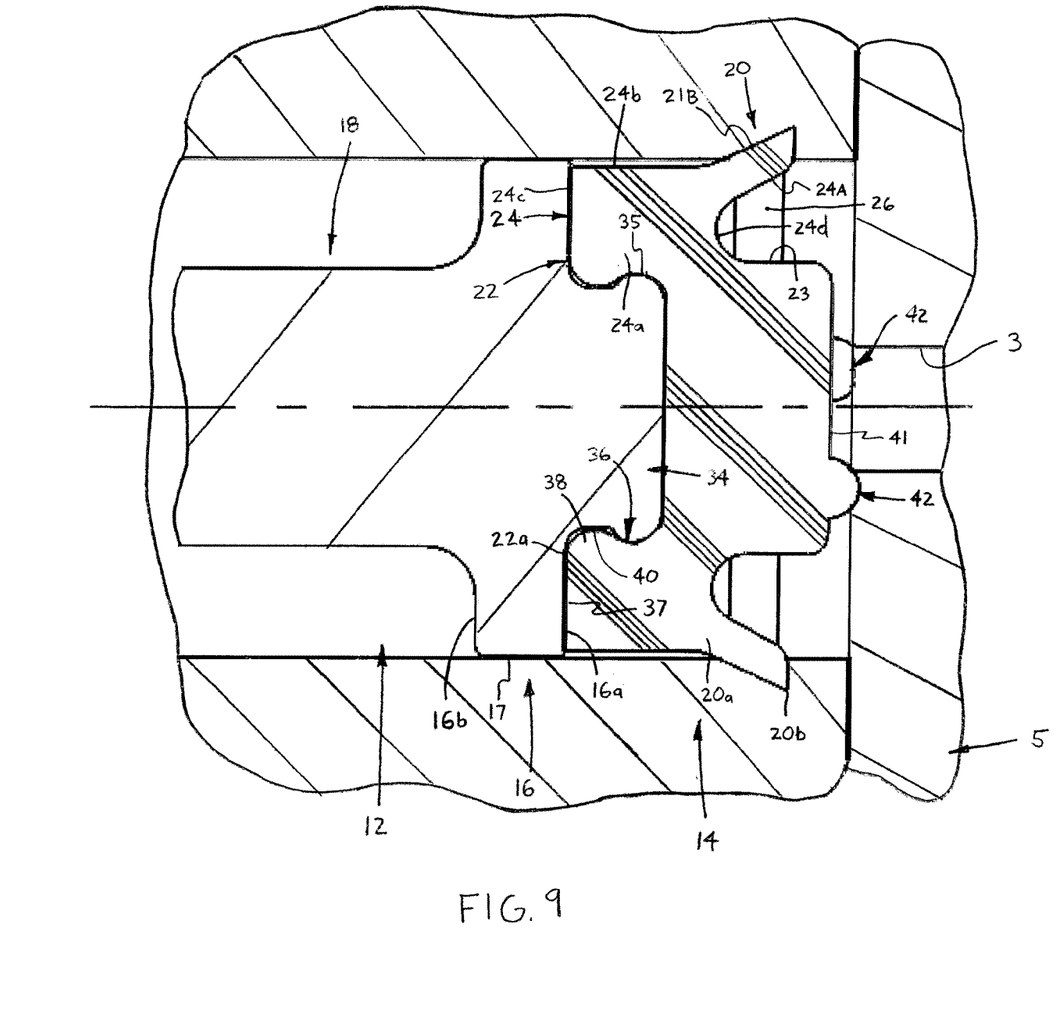
FIG. 9 is a broken-away, enlarged axial cross-sectional view of the simplified injector including a second construction piston assembly according to the present invention.
Figure 10:
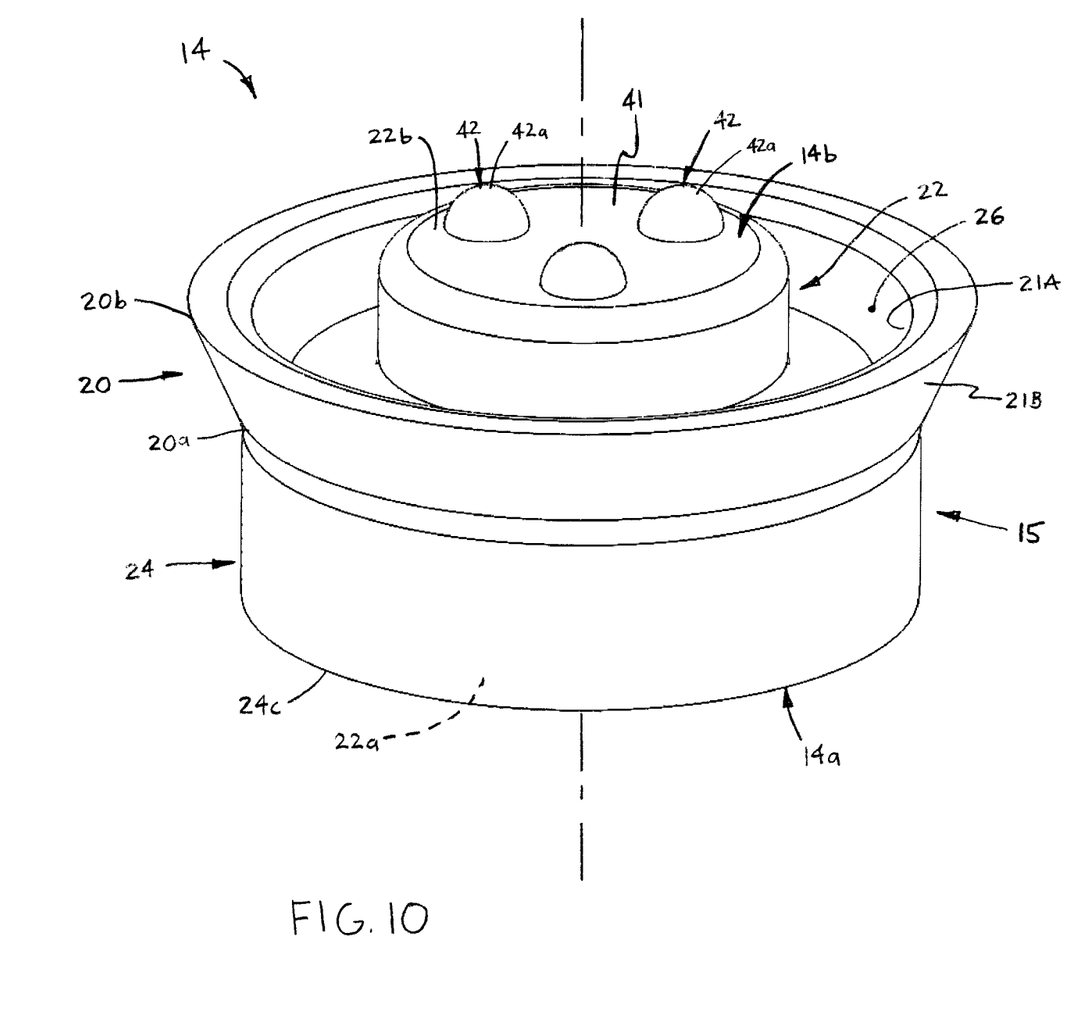
FIG. 10 is a perspective view of a seal of the second construction piston assembly.
Figure 11:
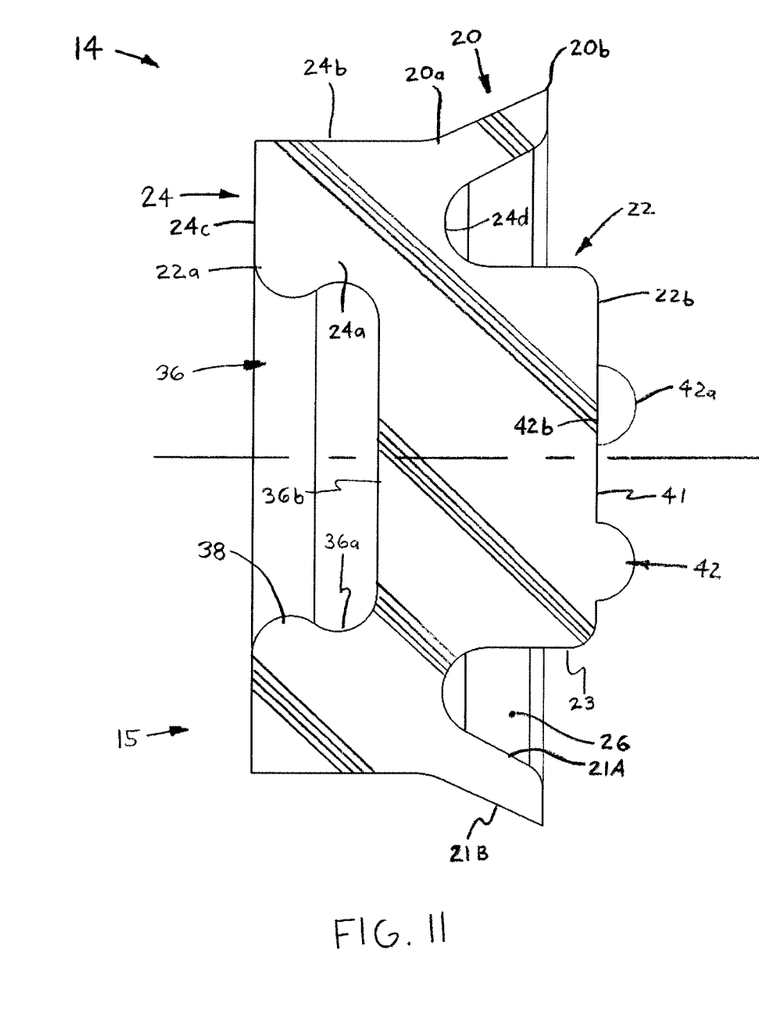
FIG. 11 is an axial cross-sectional view of the seal of FIG. 10.

Referring now to FIGS. 9-11, in other constructions of the piston assembly 10, the piston head 16 has a projection 34 and the seal 14 has a cavity 36 configured to receive the projection 34 to couple the seal 14 with the piston 12. More specifically, the projection 34 is generally cylindrical, has an outer circumferential surface 35 and extends axially outwardly from the first axial end 16a of the piston head 16. As such, an annular end surface 37 is defined on the piston head axial end 16a between the projection 34 and the piston head outer circumferential surface 17. Further, the seal cavity 36 extends axially inwardly from the first axial end 22a of the seal cylindrical portion 22 and has an inner circumferential surface 36a and a radial end surface 36b.

Preferably, the seal 14 is provided with an annular shoulder 38 that extends radially inwardly from the cavity inner surface 36a and the piston projection 34 has an annular undercut 40 configured to receive the seal shoulder 38 so as to couple the seal 14 with the piston 12. However, the piston projection 34 and the seal cavity 36 may each be formed generally "straight walled" with the piston projection 34 being diametrically sized such that the projection outer surface 35 frictionally engages with the inner surface 36a of the cavity 30 to frictionally couple the seal 14 with the piston 12. Further, the piston projection 34 may alternatively be secured in the seal cavity 36 by any other appropriate means, such as an adhesive, a fastener(s), etc.

Furthermore, the seal shoulder portion 24 is sized such that first axial end 24c of the shoulder portion 24 is located adjacent to the first axial end 22a of the cylindrical portion 22, i.e. the ends 22a, 24c are generally flush and continuous. The shoulder second axial end 24d is located generally centrally on the seal cylindrical portion 22, with the sealing lip 20 extending axially from the shoulder second axial end 24d, as discussed above. By locating the first shoulder axial end 24c continuous with the cylindrical portion axial end 22a, the shoulder 24 reinforces the relatively small radial thickness of the cylindrical portion 22 that surrounds and provides the cavity 36. Also, the shoulder first axial end 24c is disposed against the piston first axial end 16a, specifically against the piston annular surface 37, to reinforce the shoulder portion 24 and thereby the sealing lip 22.

Referring now to FIGS. 5-11, in both constructions, the seal axial end 14b, preferably the second axial end 22b of the cylindrical portion 22 as discussed above, has a radial surface 41 and a plurality of projections 42 extending axially away from the radial surface 41. Each projection 42 has an outer end 42a contactable with the chamber end face 2b so as to provide the engagement of the seal 14 with the end face 2b, and an inner end 42b integrally formed with the remainder of the cylindrical portion 22. Preferably, each projection 42 is formed having a generally hemispherical shape, but may alternatively have any other appropriate shape, such as generally rectangular, generally pyramidal, etc.

Further, the projections 42 are arranged such that the flow port 3 is at least partially open when the seal axial end 14b engages the chamber end face 2b. Specifically, the seal 12 preferably has three projections 42 arranged generally in a circle Cs (FIG. 6) with a diameter (not indicated) greater than the diameter of the flow port 3, but may include two projections 42 spaced apart by a distance of about the diameter of the spacing circle Cs or four or more projections 42 arranged about the circle Cs. In any case, the projections 42 preferably contact the chamber end face 2b radially outside of the flow port 3, and thus do not obstruct the port 3, although the projections 42 may partially overlap and partially obstruct the port 3. With the port 3 at least partially open, a quantity of fluid remains in the measuring chamber 2 and biases the sealing lip 20 radially outwardly against the chamber cylindrical surface 2a.

Figure 12:
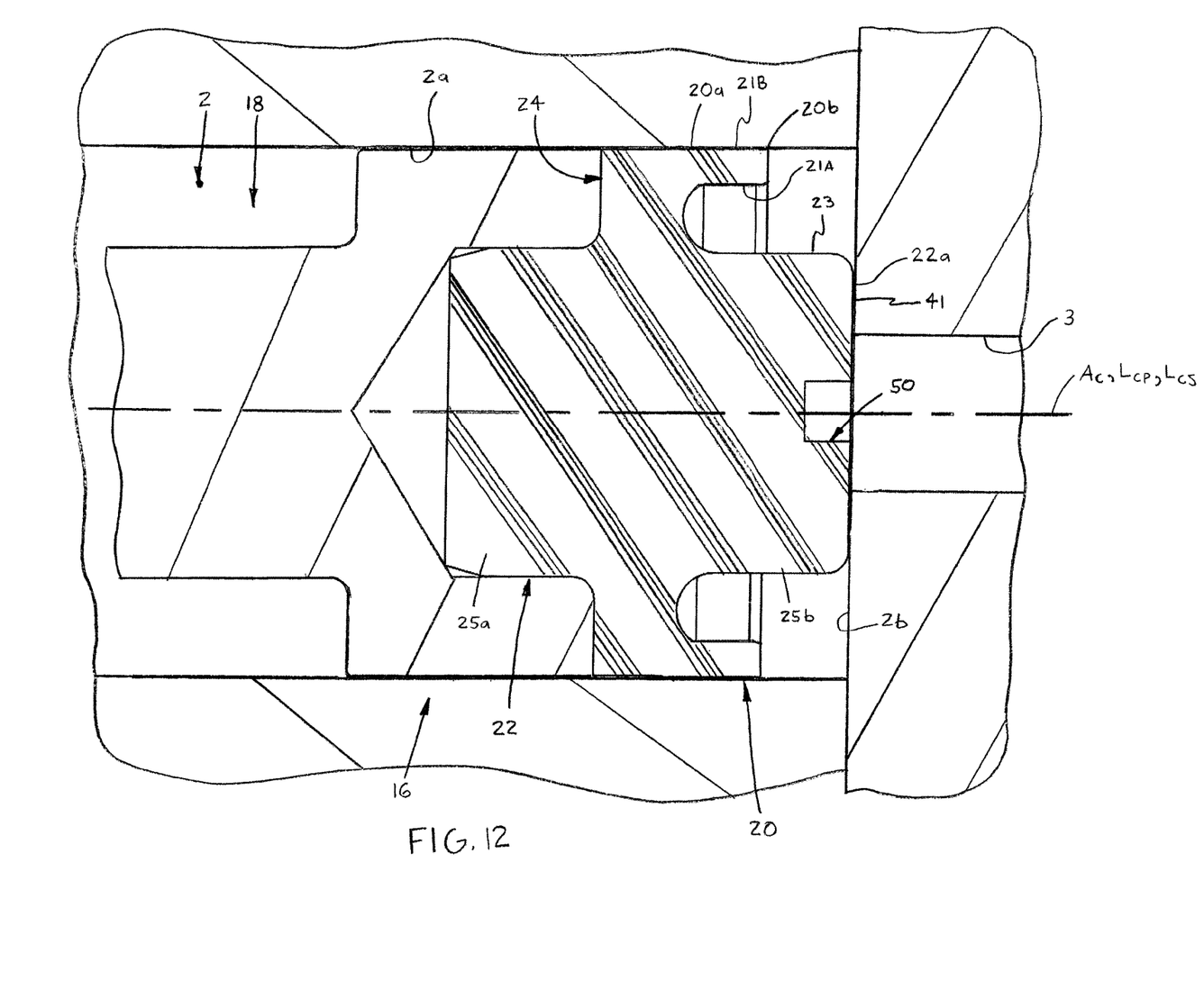
FIG. 12 is a broken-away, more enlarged axial cross-sectional view of the first construction piston assembly, shown with an alternative slotted opening in a seal end surface.

Alternatively, as shown in FIG. 12, the seal 14 may be formed without any projections and instead be provided with one or more slotted openings 50 extending generally radially and axially inwardly from the radial end surface 41 of the second axial end 22b of the cylindrical portion 22. As such, the radial surface 41 is contactable with the chamber end face 2b so as to provide the engagement of the seal 14 with the end face 2b, and the slotted opening(s) 50 provide one or more flow paths for lubricant into the chamber 2 when the piston assembly 10 is located at the first position $P_1$.

In any case, when the injector 1 is operating in a "filling" stage during which lubricant is supplied to the measuring chamber 2, lubricant is capable of entering the chamber 2 due to the open port 3 and causes an increase in pressure within the chamber 2, and particularly within the annular channel 26 of the seal 14. Thereby, pressure increases on the inner surface 21A of the sealing lip 20 to increase the outward pressure of the lip 20 against the chamber cylindrical surface 2a. As such, prior to displacement of the piston 12 during a "measuring stroke" (i.e., displacement in a direction away from the port 3 to fill the chamber 2 with a desired quantity of lubricant), the sealing lip 20 is seated against the chamber cylindrical surface 2a at a desired pressure that ensures complete sealing during the entire stroke of the piston 12. Increased pressure from lubricant entering the injector inlet 7, and thereafter the chamber port 3, causes the piston assembly 10 to displace from the first position $P_1$ indicated in FIG. 2 to the second position $P_2$, depicted in FIG. 3, at which point the chamber 2 contains the desired quantity of lubricant. Then, when pressure in the injector bore B decreases, the piston assembly 10 displaces from the second position $P_2$ back to the first position $P_1$, by action of the spring 11, and forces the quantity of lubricant from the chamber 2 (i.e., through port 3) into the bore B, which is subsequently directed from the injector outlet 8 by action of an injector plunger 9 to a lubrication point, for example, within a bearing or on a gear face (neither shown).

The piston assembly 10 of the present invention has a number of advantages over prior known injector pistons. The piston body 12 is easier to manufacture than prior designs having an outer annular seal groove and the seal 14 is easier to install on the piston 12 by insertion of a projection 32 or 34 within a complementary cavity 30 and 36. Particularly in comparison with an O-ring seal in an annular groove, the seal 14 having a deflectable sealing lip 20 avoids issues with concentricity and tolerance stack-ups. Further, by having the seal 14 instead of a piston engaging with the chamber end face 2b, the need for sealing quality surface finish requirements on the piston 12 is eliminated.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A piston assembly for a fluid delivery device, the device having a measuring chamber defined by an inner cylindrical surface and an axial end face, a flow port through the end face, and a central axis extending through the chamber, the piston assembly comprising:
    a piston body disposeable within the chamber so as to be linearly displaceable along the central axis, the piston body including a cylindrical head, the head having first and second axial ends and an outer circumferential surface, and a rod extending axially from the second axial end of the piston head; and
    a seal attached to the first axial end of the piston head so as to be linearly displaceable with the piston body along the central axis and having an annular sealing lip sealingly engageable with the inner cylindrical surface of the measuring chamber and an axial end engageable with the end face of the measuring chamber.

2. The piston assembly as recited in claim 1 wherein the seal includes:
    an inner cylindrical portion having first and second axial ends, the first axial end being coupled with the piston head and the second axial end being engageable with the end face of the measuring chamber; and
    a radial shoulder portion having an inner radial end connected with the cylindrical portion and an opposing outer radial end, the sealing lip extending axially from the outer end of the shoulder portion and being spaced radially outwardly from the cylindrical portion.

3. The piston assembly as recited in claim 2 wherein the sealing lip has a first axial end integrally formed with the outer end of the shoulder portion, a free, second axial end and an outer circumferential surface sealingly engageable with the inner cylindrical surface of the measuring chamber.

4. The piston assembly as recited in claim 3 wherein the sealing lip is tapered so as to extend radially-outwardly in an axial direction from the lip first end to the lip second end when the piston assembly is separate from the measuring chamber.

5. The piston assembly as recited in claim 2 wherein:
    the piston head has a cavity extending axially inwardly from the first axial end of the piston head; and
    the seal shoulder portion is disposed generally centrally on the seal cylindrical portion such that a first section of the cylindrical portion is defined between the shoulder and the first axial end, the cylindrical portion first section being disposed within the piston head cavity to couple the seal with the piston, and a second section of the cylindrical portion is defined between the shoulder portion and the second axial end.

6. The piston assembly as recited in claim 5 wherein:
    the piston head has an annular surface defined on the first axial end of the piston head, the annular surface extending radially between the piston cavity and the piston head outer circumferential surface; and
    the seal shoulder portion has opposing first and second axial ends, the annular surface of the piston head is disposed against the first axial end of the shoulder, and the sealing lip extends axially from the second axial end of the shoulder portion.

7. The piston assembly as recited in claim 2 wherein:
    the piston head has a cylindrical projection extending axially outwardly from the first axial end of the piston;
    the seal cylindrical portion has a cavity extending axially inwardly from the first axial end of the cylindrical portion, the piston projection being disposed within the cavity of the seal cylindrical portion to couple the seal with the piston.

8. The piston assembly as recited in claim 7 wherein the seal shoulder portion has first and second axial ends, the first axial end of the shoulder portion being adjacent to the cylindrical portion first axial end and disposed against the piston first axial end, and the sealing lip extends axially from the second axial end of the shoulder portion.

9. The piston assembly as recited in claim 2 wherein an annular channel is defined between the cylindrical body portion and the sealing lip and the sealing lip is configured to be biased radially outwardly by fluid within the annular channel.

10. The piston assembly as recited in claim 1 wherein the seal axial end has a radial surface and one of:
    a plurality of projections extending axially away from the radial surface, each projection having an outer end contactable with the end face of the measuring chamber, the projections being arranged such that the flow port is at least partially open when the seal axial end engages the end face of the measuring chamber; and
    a slotted opening extending axially inwardly from the radial end surface and providing at least one flow path from the flow port when the end surface contacts the end face of the measuring chamber.

11. The piston assembly as recited in claim 1 wherein one of:
    the piston head has a cavity extending inwardly from the first axial end of the piston head and the seal includes a projection disposed within the cavity to couple the seal with the piston; and
    the seal has first and second axial ends and a cavity extending inwardly from the first axial end of the seal, the second axial end of the seal being engageable with the end face of the measuring chamber, and the piston head includes a projection extending axially from the first axial end and disposeable within the seal cavity to couple the seal with the piston.

12. A seal for a piston assembly for a fluid delivery device, the device having a measuring chamber defined by an inner cylindrical surface and an axial end face, a flow port through the end face, and a central axis extending through the chamber, the piston assembly including a piston body disposeable within the chamber so as to be linearly displaceable along the central axis and including a head having first and second axial ends, the seal comprising:
    a cylindrical polymeric body having a first axial end coupled with the first axial end of the piston head, an annular sealing lip sealingly engageable with the inner cylindrical surface of the measuring chamber and a second axial end engageable with the end face of the measuring chamber;

wherein the seal cylindrical polymeric body includes an inner cylindrical portion having first and second axial ends, the first axial end being coupled with the piston head and the second axial end being engageable with the end face of the measuring chamber, and a radial shoulder portion having an inner radial end connected with the cylindrical portion and an opposing outer radial end, the sealing lip extending axially from the outer end of the shoulder portion and being spaced radially outwardly from the cylindrical portion.

13. The seal as recited in claim 12 wherein the sealing lip has a first axial end integrally formed with the outer end of the shoulder portion, a free, second axial end and an outer circumferential surface sealingly engageable with the inner cylindrical surface of the measuring chamber.

14. The seal as recited in claim 13 wherein the sealing lip is tapered so as to extend radially-outwardly in an axial direction from the lip first end to the lip second end when the piston assembly is separate from the measuring chamber.

15. The seal as recited in claim 12 wherein an annular channel is defined between the cylindrical body portion and the sealing lip and the sealing lip is configured to be biased radially outwardly by fluid within the annular channel.

16. The seal as recited in claim 12 wherein:
the piston head has a cavity extending axially inwardly from the first axial end of the piston head; and
the seal shoulder portion is disposed generally centrally on the seal cylindrical portion such that a first section of the cylindrical portion is defined between the shoulder and the first axial end, the cylindrical portion first section being disposed within the piston head cavity to couple the seal with the piston, and a second section of the cylindrical portion is defined between the shoulder portion and the second axial end.

17. The seal as recited in claim 16 wherein:
the piston head has an annular surface defined on the first axial end of the piston head, the annular surface extending radially between the piston cavity and the piston head outer circumferential surface; and
the seal shoulder portion has opposing first and second axial ends, the annular surface of the piston head is disposed against the first axial end of the shoulder, and the sealing lip extends axially from the second axial end of the shoulder portion.

18. The seal as recited in claim 12 wherein:
the piston head has a cylindrical projection extending axially outwardly from the first axial end of the piston;
the seal cylindrical portion has a cavity extending axially inwardly from the first axial end of the cylindrical portion, the piston projection being disposed within the cavity of the seal cylindrical portion to couple the seal with the piston.

19. A seal for a piston assembly for a fluid delivery device, the device having a measuring chamber defined by an inner cylindrical surface and an axial end face, a flow port through the end face, and a central axis extending through the chamber, the piston assembly including a piston body disposeable within the chamber so as to be linearly displaceable along the central axis and including a head having first and second axial ends, the seal comprising:
a cylindrical polymeric body having a first axial end coupled with the first axial end of the piston head, an annular sealing lip sealingly engageable with the inner cylindrical surface of the measuring chamber and a second axial end engageable with the end face of the measuring chamber;
wherein the second axial end of the cylindrical polymeric body has a radial surface and one of:
a plurality of projections extending axially away from the radial surface, each projection having an outer end contactable with the end face of the measuring chamber, the projections being arranged such that the flow port is at least partially open when the seal axial end engages the end face of the measuring chamber; and
a slotted opening extending axially inwardly from the radial surface and providing at least one flow path from the flow port when the radial surface contacts the end face of the measuring chamber.

20. A piston assembly for a fluid delivery device, the device having a measuring chamber defined by an inner cylindrical surface and an axial end face, a flow port through the end face, and a central axis extending through the chamber, the piston assembly comprising:
a piston body disposeable within the chamber so as to be linearly displaceable along the central axis, the piston body including a cylindrical head, the head having first and second axial ends and an outer circumferential surface, and a rod extending axially from the second axial end of the piston head; and
a seal coupled with the first axial end of the piston head and having an annular sealing lip sealingly engageable with the inner cylindrical surface of the measuring chamber and an axial end engageable with the axial end face of the measuring chamber;
wherein one of:
the piston head has a cavity extending inwardly from the first axial end of the piston head and the seal includes a projection disposed within the cavity to couple the seal with the piston; and
the seal has first and second axial ends and a cavity extending inwardly from the first axial end of the seal, the second axial end of the seal being engageable with the end face of the measuring chamber, and the piston head includes a projection extending axially from the first axial end and disposeable within the seal cavity to couple the seal with the piston.

* * * * *